(12) United States Patent
Takahashi et al.

(10) Patent No.: US 9,286,939 B2
(45) Date of Patent: Mar. 15, 2016

(54) INFORMATION-PROCESSING SYSTEM, INFORMATION-PROCESSING DEVICE, STORAGE MEDIUM, AND METHOD

(71) Applicant: NINTENDO CO., LTD., Kyoto (JP)

(72) Inventors: Shinya Takahashi, Kyoto (JP); Toshiaki Suzuki, Kyoto (JP); Akihiro Umehara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 29 days.

(21) Appl. No.: 13/927,627

(22) Filed: Jun. 26, 2013

(65) Prior Publication Data

US 2014/0153896 A1   Jun. 5, 2014

(30) Foreign Application Priority Data

Dec. 4, 2012   (JP) ................................ 2012-265766
May 17, 2013   (JP) ................................ 2013-104787

(51) Int. Cl.
*H04N 7/00*   (2011.01)
*H04N 9/80*   (2006.01)
*G11B 27/031*   (2006.01)
*G06F 3/147*   (2006.01)

(52) U.S. Cl.
CPC .............. *G11B 27/031* (2013.01); *G06F 3/147* (2013.01)

(58) Field of Classification Search
USPC .......... 348/36, 37, 38, 39; 386/239, 242, 248
See application file for complete search history.

(56) References Cited

U.S. PATENT DOCUMENTS

| | | | | |
|---|---|---|---|---|
| 6,559,846 B1* | 5/2003 | Uyttendaele et al. | ......... | 345/473 |
| 2002/0167541 A1* | 11/2002 | Ando et al. | ................... | 345/723 |
| 2006/0114251 A1* | 6/2006 | Miller | ............................ | 345/419 |
| 2012/0075412 A1* | 3/2012 | Miyamoto et al. | .............. | 348/36 |
| 2013/0169685 A1* | 7/2013 | Lynch | ........................... | 345/634 |
| 2014/0152764 A1 | 6/2014 | Kira et al. | | |

OTHER PUBLICATIONS

[Online]—"Using Street View", http://maps.google.com/intl/en/help/maps/streetview/learn/using-street-view.html, 1 page, printed Apr. 26, 2013.
Office Action issued in U.S. Appl. No. 14/078,855 dated Oct. 16, 2015.
Google Street View, Google, released May 25, 2007—(currently found at http://www.google.com/maps/streetview/—accessed Jan. 7, 2016)) [online].
"Using Street View," https://web.archive.org/web/20120124015557/http://maps.google.com/intl/en/help/maps/streetview/learn/using-street-view.html, 2 pages, Jan. 24, 2012.

* cited by examiner

*Primary Examiner* — Daquan Zhao
(74) *Attorney, Agent, or Firm* — Nixon & Vanderhye P.C.

(57) ABSTRACT

An exemplary information-processing system includes: an obtaining unit configured to obtain a plurality of images, each of which is clipped from each of a plurality of panoramic images, the plurality of images being determined in response to a pathway on a map, each of the plurality of panoramic images corresponding to a point on the map; and a display control unit configured to control a display unit to display the plurality of images obtained by the obtaining unit sequentially.

19 Claims, 10 Drawing Sheets

INFORMATION-PROCESSING SYSTEM, INFORMATION-PROCESSING DEVICE, STORAGE MEDIUM, AND METHOD

CROSS REFERENCE TO RELATED APPLICATION

The disclosures of Japanese Patent Applications No. 2012-265766, filed on Dec. 4, 2012, and 2013-104787, filed on May 17, 2013, are incorporated herein by reference.

FIELD

The present disclosure relates to displaying images corresponding to a pathway on a map.

BACKGROUND AND SUMMARY

Technologies for displaying a part of a picture (a panoramic image) captured at a point on a map, is known.

The present disclosure provides a system for sequentially displaying images clipped from panoramic images corresponding to a pathway from a start point to a destination, making operation easier for a user.

There is provided an information-processing system including: an obtaining unit that obtains a plurality of images, each of which is clipped from each of a plurality of panoramic images, the plurality of images being determined in response to a pathway on a map, each of the plurality of panoramic images corresponding to a point on the map; and a display control unit that controls a display unit to display the plurality of images obtained by the obtaining unit sequentially.

BRIEF DESCRIPTION OF THE DRAWINGS

Exemplary embodiments will be described with reference to the following drawings, wherein.

DETAILED DESCRIPTION OF NON-LIMITING EXEMPLARY EMBODIMENT

1. Outline

Figure 1:
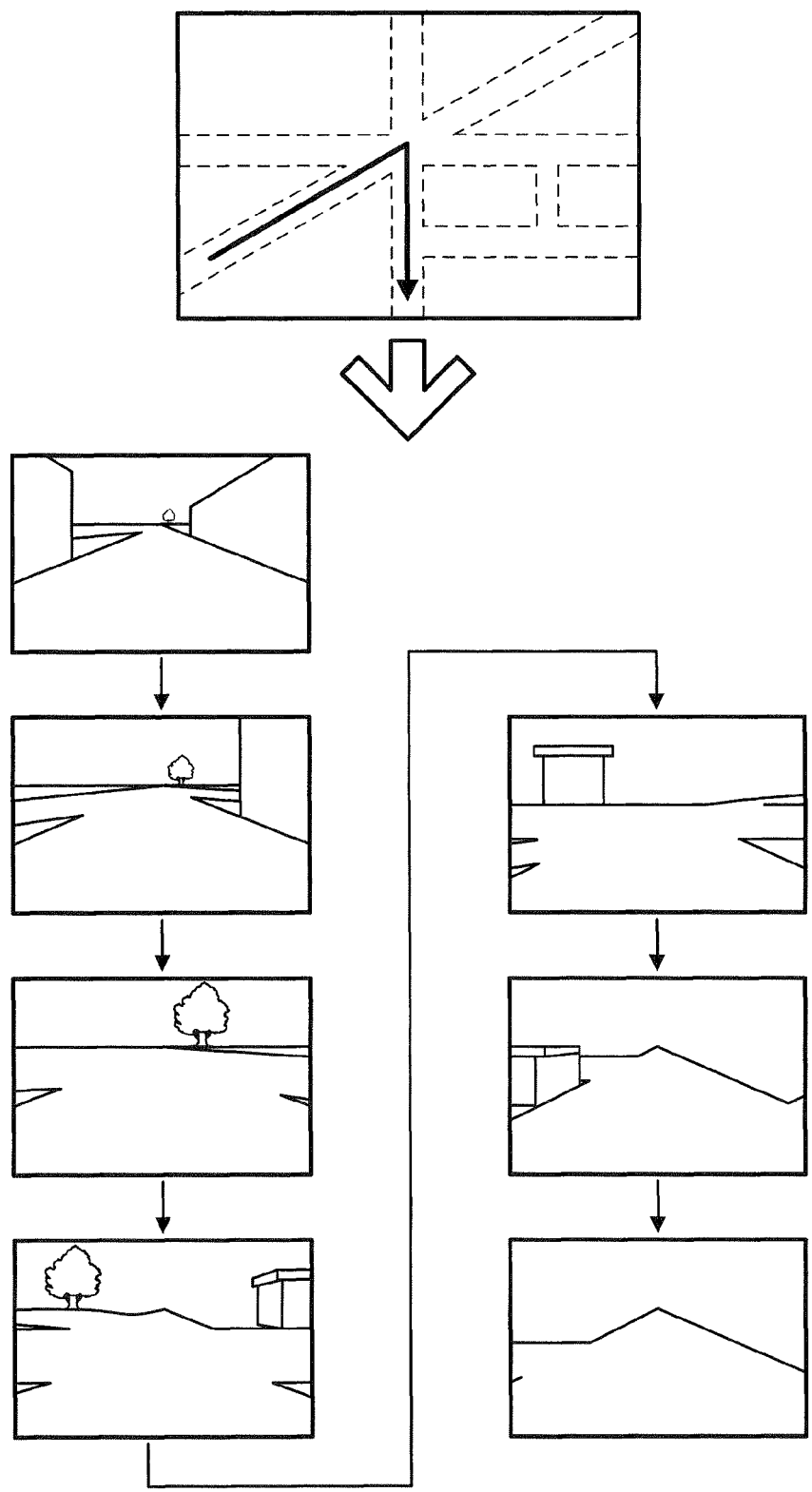
FIG. 1 shows an outline of one exemplary embodiment.

FIG. 1 shows an outline of one exemplary embodiment. In this exemplary embodiment, if a pathway (or a route) on a map is given, plural images, each of which is clipped from one of plural panoramic images corresponding to the given pathway, are sequentially shown in an order corresponding to the pathway. Hereinafter, an image clipped from a panoramic image is referred to as a "partial image." In other words, if a pathway is given, the partial images are sequentially shown as a "flip animation" in response to the pathway.

2. Configuration

Figure 2:
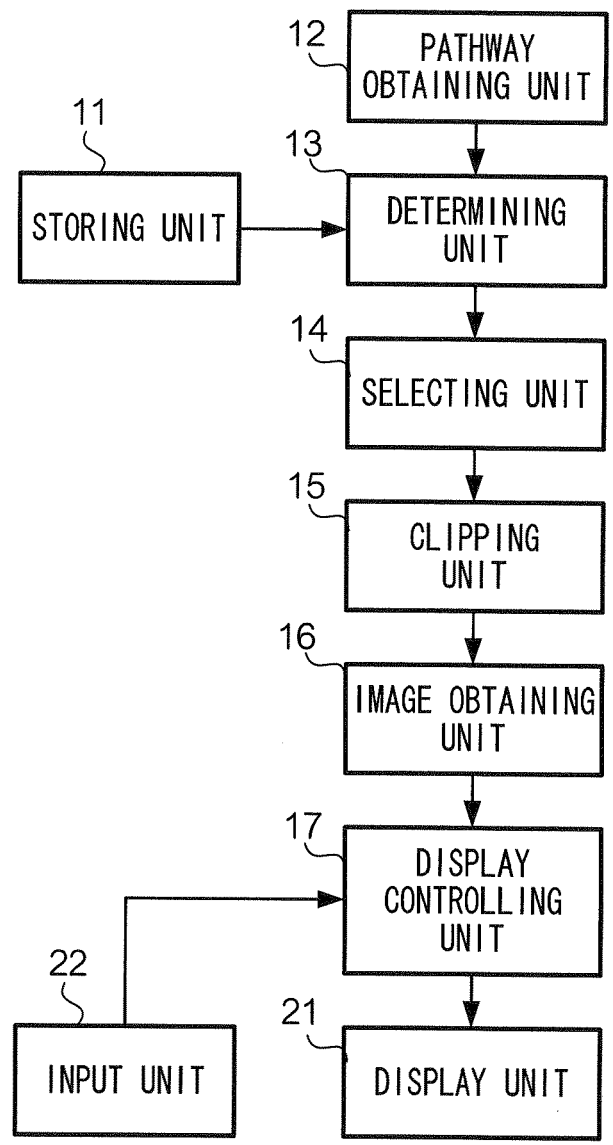
FIG. 2 shows an example of a functional configuration of information-processing system 1.

FIG. 2 shows an example of a functional configuration of information-processing system 1, according to one exemplary embodiment. Information-processing system 1 includes storing unit 11, pathway obtaining unit 12, determining unit 13, selecting unit 14, clipping unit 15, image obtaining unit 16, display controlling unit 17, display unit 21, and input unit 22.

Storing unit 11 stores plural panoramic images. A panoramic image is an image captured with elongated fields of view. The panoramic image is captured from a single point, and has elongated fields of view in a predetermined range for at least one of pitch and yaw. Each of the plural panoramic images corresponds to a point on a map. Pathway obtaining unit 12 obtains a pathway on the map. Determining unit 13 determines (extracts or selects) plural panoramic images corresponding to the pathway, from among the plural panoramic images stored in storing unit 11. Selecting unit 14 selects plural panoramic images from the plural panoramic images determined by determining unit 13, by reducing the determined panoramic images according to a predetermined rule. Clipping unit 15 clips a part of each plural panoramic image selected by selecting unit 14. Image obtaining unit 16 obtains the images (partial images) clipped by clipping unit 15. Display control unit 17 controls display unit 21 to display the plural partial images sequentially in an order relating to the pathway.

Display unit 21 displays the partial image. Input unit 22 inputs an instruction relating to displaying an image, into information-processing system 1. In this example, display controlling unit 17 pauses updating a displayed image, in response to an instruction input via input unit 22. Further, display controlling unit 17 moves the displayed part of a panoramic image from which the paused partial image is clipped.

Figure 3:
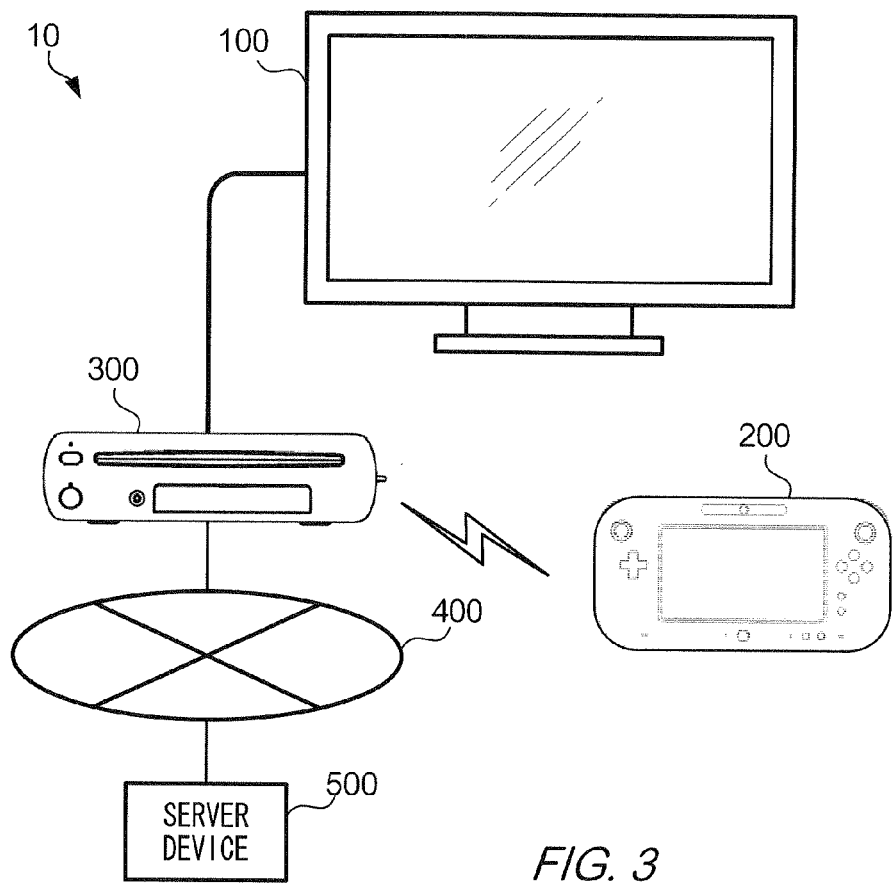
FIG. 3 shows an example of a configuration of information-processing system 1.

FIG. 3 shows an example of a configuration of information-processing system 1. In this example, information-processing system 1 includes display device 100, terminal device 200, information-processing device 300, and server device 500. Information-processing device 300 is, for example, a console-type game device. Information-processing device 300 and server device 500 are connected via network 400. Network 400 is, for example, the Internet.

Display device 100 is a stationary display device; for example, a television. Terminal device 200 is a device to receive an instruction input by a user. Further, terminal device 200 displays information. Terminal device 200 is shaped to be held in one hand or two hands. Information-processing device 300 is a computer device to execute a process for displaying an image on display device 100 and terminal device 200. Information-processing device 300 receives data used for displaying an image, from server device 500 in response to an instruction input by a user. Information-processing device 300 provides image data to display device 100 and terminal device 200. Image data is data for displaying an image on at least one of display device 100 and terminal device 200. Server device 500 is a computer device providing information relating to a map.

Figure 4:
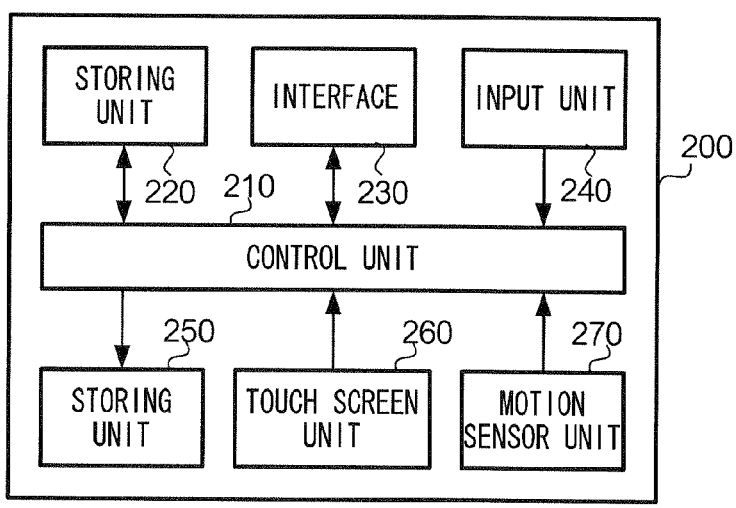
FIG. 4 shows an example of a hardware configuration of terminal device 200.

FIG. 4 shows an example of a hardware configuration of terminal device 200. Terminal device 200 includes control unit 210, storing unit 220, interface 230, input unit 240, display unit 250, touch screen unit 260, and motion sensor unit 270.

Control unit 210 controls the hardware elements of terminal device 200. Control unit 210 includes a CPU (Central Processing Unit) and a memory. The CPU executes various processes with a program. Storing unit 220 includes a storage device for storing data; for example, a flash memory. Interface 230 is a device for exchanging data with information-processing device 300, and includes an antenna and a modem, for example. Interface 230 communicates with information-processing device 300 according to a predetermined communication standard. Input unit 240 includes, for example, at least one of a keypad, a button, and a stick, for receiving an instruction (or an operation input) input by a user. Input unit 240 provides a signal in response to an instruction input by a user. Display unit 250 includes a display device, for example, an LCD (Liquid Crystal Display) panel or an organic EL (electroluminescence) panel and a driver circuit thereof. Display unit 250 displays data according to the image data. Touch screen unit 260 is an input device that provides to control unit 210 coordinate data showing a position touched (or indicated) by a user.

Motion sensor unit 270 detects motion of terminal device 200 and outputs a signal showing the detected motion. Motion sensor unit 270 includes, for example, an acceleration sensor (a triaxial acceleration sensor) for measuring acceleration of terminal device 200, a gyro sensor for measuring a change of angle or an angular velocity of terminal device 200, and an earth magnetism sensor for measuring earth magnetism. Motion sensor unit 270 provides to control unit 210 a signal showing a measured physical quantity. For example, if terminal device 200 is tilted, terminal device 200 outputs a signal in response to the direction of tilt.

Figure 5:
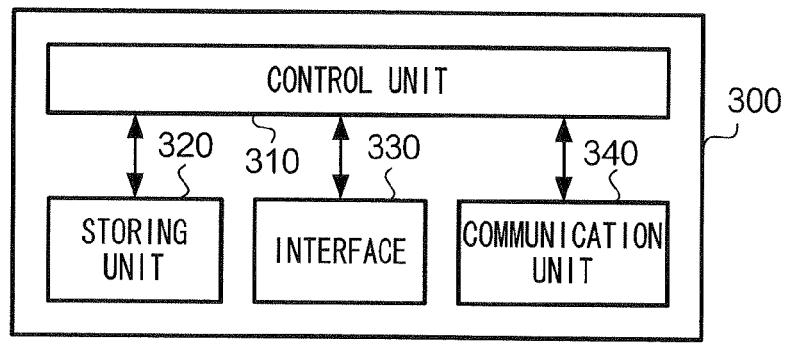
FIG. 5 shows an example of a hardware configuration of information-processing device 300.

FIG. 5 shows an example of a hardware configuration of information-processing device 300. Information-processing device 300 includes control unit 310, storing unit 320, interface 330, and communication unit 340. Control unit 310 controls the hardware elements of information-processing device 300, and includes a CPU, a GPU (Graphic Processing Unit), and a memory. Storing unit 320 includes a storage device for storing data; for example, a flash memory or a hard disk drive. Interface 330 includes a device for communicating data with terminal device 200. Interface 330 communicates with terminal device 200 by wireless communication, and communicates with display device 100 by wired communication. Communication unit 340 exchanges data with server device 500 via network 400.

In this example, storing unit 320 stores a program that causes a computer device to execute a process for sequentially displaying, in an order corresponding to the pathway, the plural partial images, each of which is clipped from the plural panoramic images. Hereinafter, the program is referred to as a "map program." By control unit 310 executing the map program, at least a part of functions shown in FIG. 2 are implemented in information-processing device 300.

Figure 6:
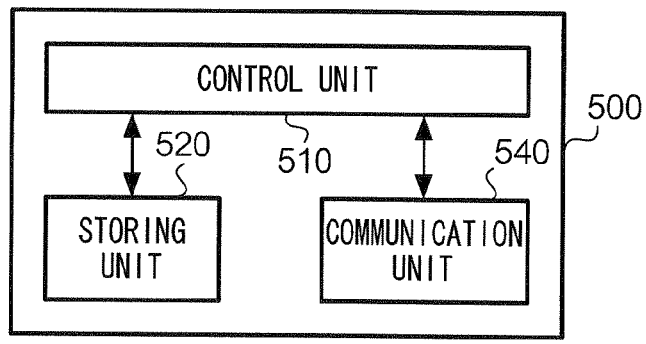
FIG. 6 shows an example of a hardware configuration of server device 500.

FIG. 6 shows an example of a hardware configuration of server device 500. Server device 500 includes control unit 510, storing unit 520, and communication unit 540. Control unit 510 controls the hardware elements of server device 500, and includes; for example, a CPU and a memory. Storing unit 520 includes a device for storing data; for example, a flash memory or a hard disk drive. Communication unit 540 exchanges data with information-processing device 300 via network 400.

In this example, storing unit 520 stores a database containing plural panoramic images. Further, storing unit 520 stores a program that causes a computer device to execute a process for providing data in response to a request from information-processing device 300 (a terminal device). Hereinafter, the program is referred to as a "server program." By control unit 510 executing the server program, at least a part of functions shown in FIG. 2 is implemented in server device 500.

In information-processing system 1, storing unit 520 of server device 500 is an example of storing unit 11. Control unit 510 executing the server program is an example of determining unit 13. Control unit 310 executing the map program is an example of pathway obtaining unit 12, selecting unit 14, clipping unit 15, image obtaining unit 16, and display controlling unit 17. Display unit 250 of terminal device 200 is an example of display unit 21. Input unit 240 and motion sensor unit 270 together are an example of input unit 22.

3. Operation

Figure 7:
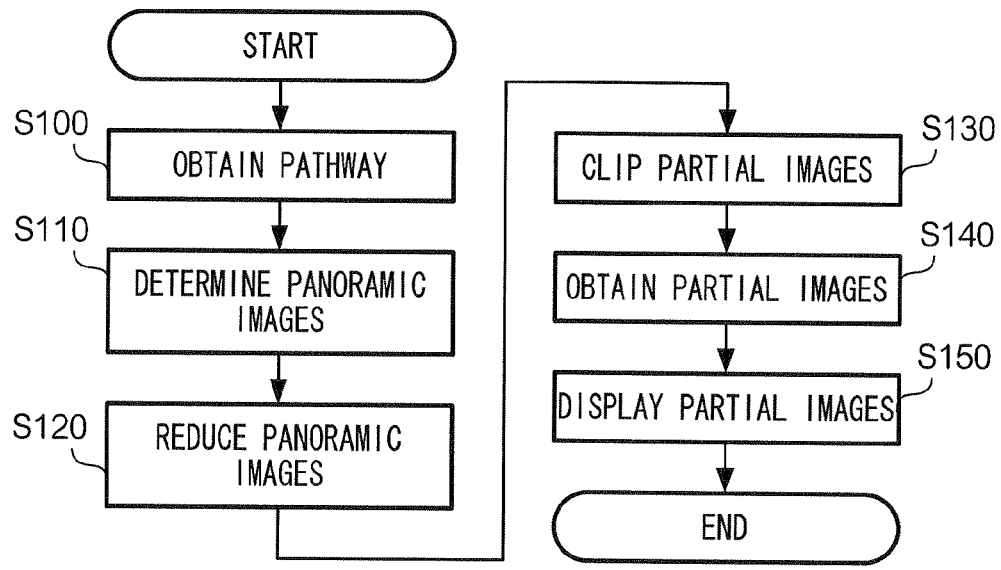
FIG. 7 shows an example of a flowchart illustrating an operation of information-processing system 1.

FIG. 7 shows an example of a flowchart illustrating an operation of information-processing system 1. The flow shown in FIG. 7 is triggered, for example, by an instruction to display partial images corresponding to a pathway, when the server program is being executed in server device 500 and the map program is being executed in information-processing device 300. The processes described in the following are provided by the map program and the server program.

In step S100, a pathway on a map is obtained.

Figure 8:
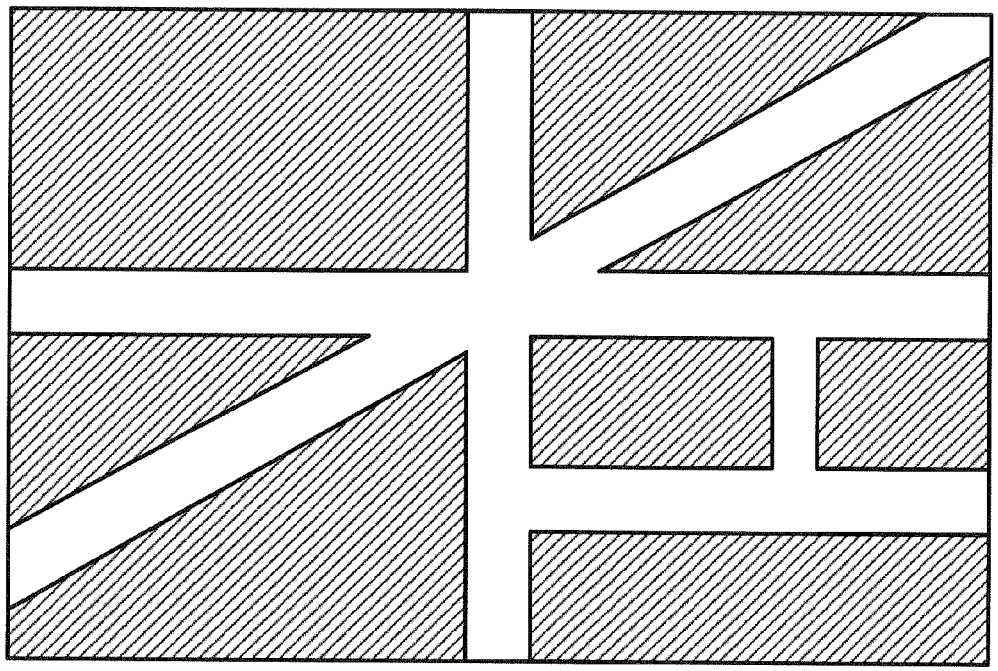
FIG. 8 shows an example of a map provided by the map program.

FIG. 8 shows an example of a map provided by the map program. The map includes a part denoting a road and a part denoting other physical features. In FIG. 8, the part denoting other physical features is shown by hatching for simplification. It is to be noted that the part denoting other physical features may be shown by a graphic of a building, for example. Positions on the map are identified by coordinates in a predetermined coordinate system, for example, latitude and longitude. In this example, plural points are discretely positioned on the map. A unique identification is allocated to each of the plural points, so as to identify each point.

Figure 9:
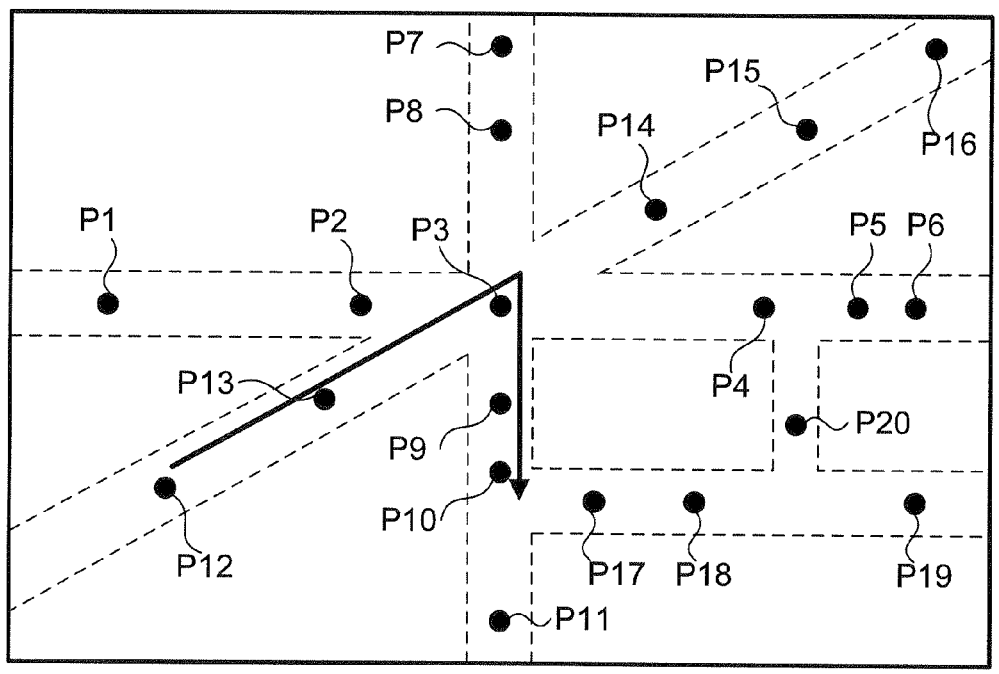
FIG. 9 shows an example of points on the map.

FIG. 9 shows an example of points on the map. In this example, twenty points, P1 to P20, are located on the map. It is to be noted that these points are virtual points and may not be displayed on the screen. A user identifies a start point by touching a point on the map, and further identifies a pathway by dragging the finger along the pathway to a destination on the map. In FIG. 9, an example of a pathway identified by a user is also shown. The pathway starts from point P1, goes through points P13, P3, and P9, and ends at point P10.

Referring to FIG. 7 again, in step S110, panoramic images corresponding to the pathway are determined (or identified). In this example, server device 500 determines the plural panoramic images corresponding to the pathway. Each of the points shown in FIG. 9 corresponds to a panoramic image. If a pathway is determined, points included in the pathway are determined, and then panoramic images corresponding to the points included in the pathway are determined. Allocating a unique identification to each point has the same meaning as allocating a unique identification to each panoramic image.

Figure 10:
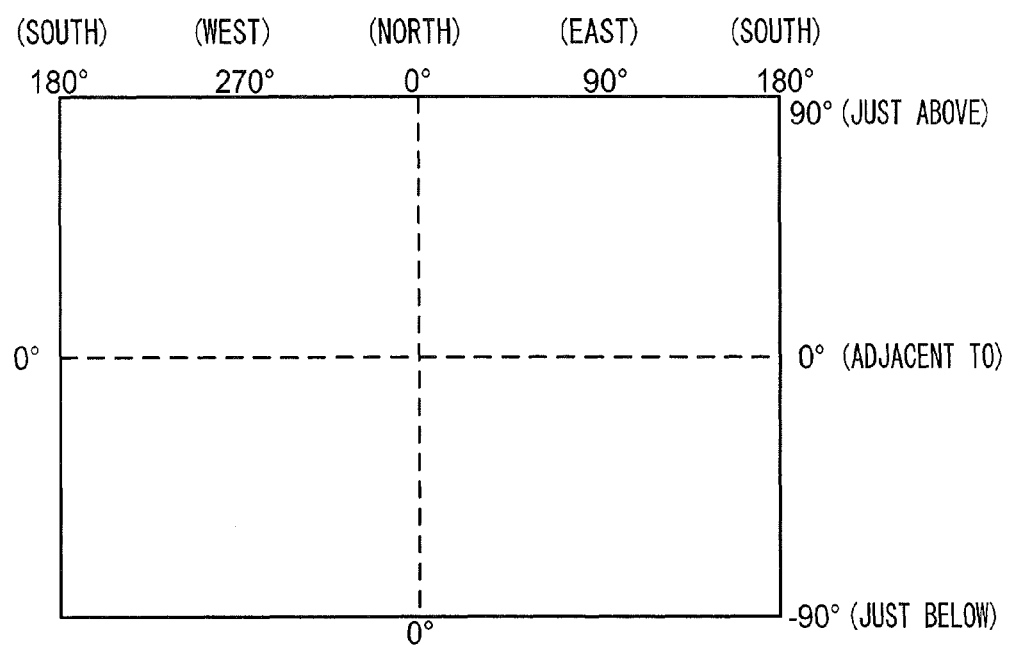
FIG. 10 shows an example of a structure of a panoramic image.

FIG. 10 shows an example of a structure of a panoramic image. In this example, the panoramic image is a rectangular image whose vertical scale corresponds to the pitch of +90° to −90° (from just above to just under) and whose horizontal scale corresponds to the yaw of 0° to 360° (north to north). The panoramic image is obtained by capturing images of views all-around a single point. It is to be noted that, in this example, the angle corresponds to a line of sight of a user. For example, the image at the origin of the coordinate system of the panoramic image corresponds to a view seen by a user who stands at a point and faces true north.

Referring to FIG. 7 again in step S120, panoramic images used for clipping partial images are determined from among the plural panoramic images determined in step S110. In other words, the plural panoramic images determined in step S110 are reduced. This process is introduced for the following reasons. If there are many points on the pathway, it may take a long time to display all partial images corresponding to all points included in the pathway sequentially, from the start point to the destination. To avoid taking too long to display partial images along the pathway, the panoramic images are reduced according to a predetermined condition. The condition may be, for example, that panoramic images are reduced so as to equalize distances between points on the map. If there is a first area where points are located every 100 m and a second area where points are located every 10 m, panoramic images corresponding to the second area are reduced. For another example, the condition may be for reducing panoramic images so as to the number of panoramic images are less than or equal to a threshold. The threshold may be a constant or a valuable depending on a distance of the pathway on the map or an instruction by a user.

It is to be noted that the condition for reducing may include at least one of the following conditions:
a) Points corresponding to an intersection have higher priority to be retained;
b) Points corresponding to a near location have higher priority to be retained; and
c) Points corresponding to a straight line have higher priority to be reduced.

In step S130, partial images are clipped from the plural panoramic images selected in step S120. Details of the clipping are as follows. For a panoramic image, a first mapping is formed on a three-dimensional object corresponding to a range for capturing the panoramic image. For a part corresponding to a designated pitch and yaw among the first mapping formed on the three-dimensional object, a second mapping is formed on a plane face corresponding to a display area. The second mapping is the partial image. Hereinafter, to form the second mapping from the panoramic image is referred to as "clipping a partial image from a panoramic image." It is to be noted that to form a mapping on a three-dimensional object or on a plane face, well-known technology may be used.

In step S140, plural partial images are obtained. In step S150, the plural partial images are sequentially displayed one by one, in an order according to the pathway.

Figure 11:
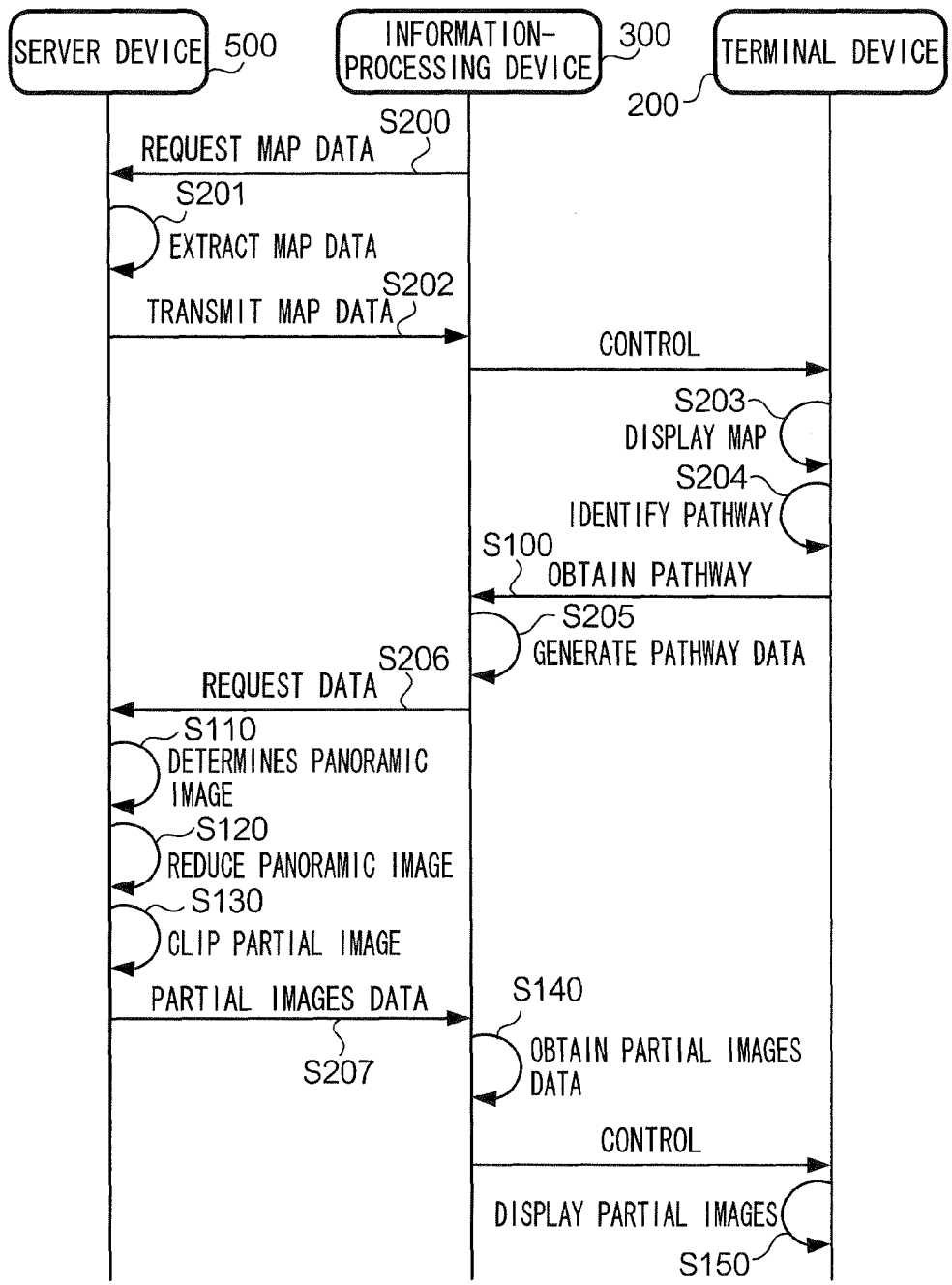
FIG. 11 shows an example of an assignation of functions in terminal device 200.

FIG. 11 shows an example of an assignation of functions in terminal device 200, information-processing device 300, and server device 500. In this example, storing unit 520 is an example of storing unit 11. Control unit 310 executing the map program is an example of pathway obtaining unit 12, image obtaining unit 16, and display controlling unit 17. Control unit 510 executing the server program is an example of determining unit 13, selecting unit 14, and clipping unit 15. Display unit 250 is an example of display unit 21. Input unit 240 and touch screen unit 260 together are an example of input unit 22. Data for displaying the map shown in FIG. 8 (the data is referred to as "map data" hereinafter) is stored in storing unit 520.

In step S200, control unit 310 of information-processing device 300 transmits a request for the map data to server device 500. The request includes a parameter for determining map data to be used for displaying, for example, coordinates and diminishing scale. If control unit 510 of server device 500 receives the request, control unit 510 extracts (in step S201) the map data determined by the parameter included in the request, from among items of data stored in storing unit 520. Control unit 510 transmits (in step S202) the extracted map data to information-processing device 300. Control unit 310 of information-processing device 300 controls (in step S203) display unit 250 to display an image (a map) in accordance with the received map data.

The user identifies (in step S204) a pathway by touching touch screen unit 260 with reference to the map displayed on touch screen unit 260. Control unit 310 obtains (in step S100) information showing the pathway identified by the user. Control unit 310 generates (in step S205) data showing the pathway, based on the information obtained from terminal device 200. Hereinafter, the data showing the pathway is referred to as "pathway data." The pathway data includes identifications of points included in the pathway. In an example shown in FIG. 9, the pathway data includes identifications of points P12, P13, P3, P9, and P10. After generating the pathway data, control unit 310 transmits (in step S206) a request for data to server device 500. The request includes, for example, the pathway data and a parameter used for reducing the panoramic images (for example, an upper threshold of the number of panoramic images).

When receiving the request from information-processing device 300, control unit 510 of server device 500 determines (or identifies) (in step S110) panoramic images corresponding to plural points shown by the pathway data included in the request, from among panoramic images recorded in a database stored in storing unit 520. Then, control unit 510 reduces (in step S120) the panoramic images using the parameter included in the received request. Control unit 510 clips (in step S130) a partial image from each of the reduced panoramic images. It is to be noted that a direction of the line of sight has to be identified to clip a partial image from a panoramic image. The details of the process are summarized as follows: the process described below includes (1) a process for clipping plural partial images corresponding to different directions of the line of sight, at a position where an angle of rotation is large (for example, at a corner), and (2) a process for changing the direction of the line of sight to a direction after the curve, at a position before an angle of rotation is large (for example, at a corner).

Figure 12:
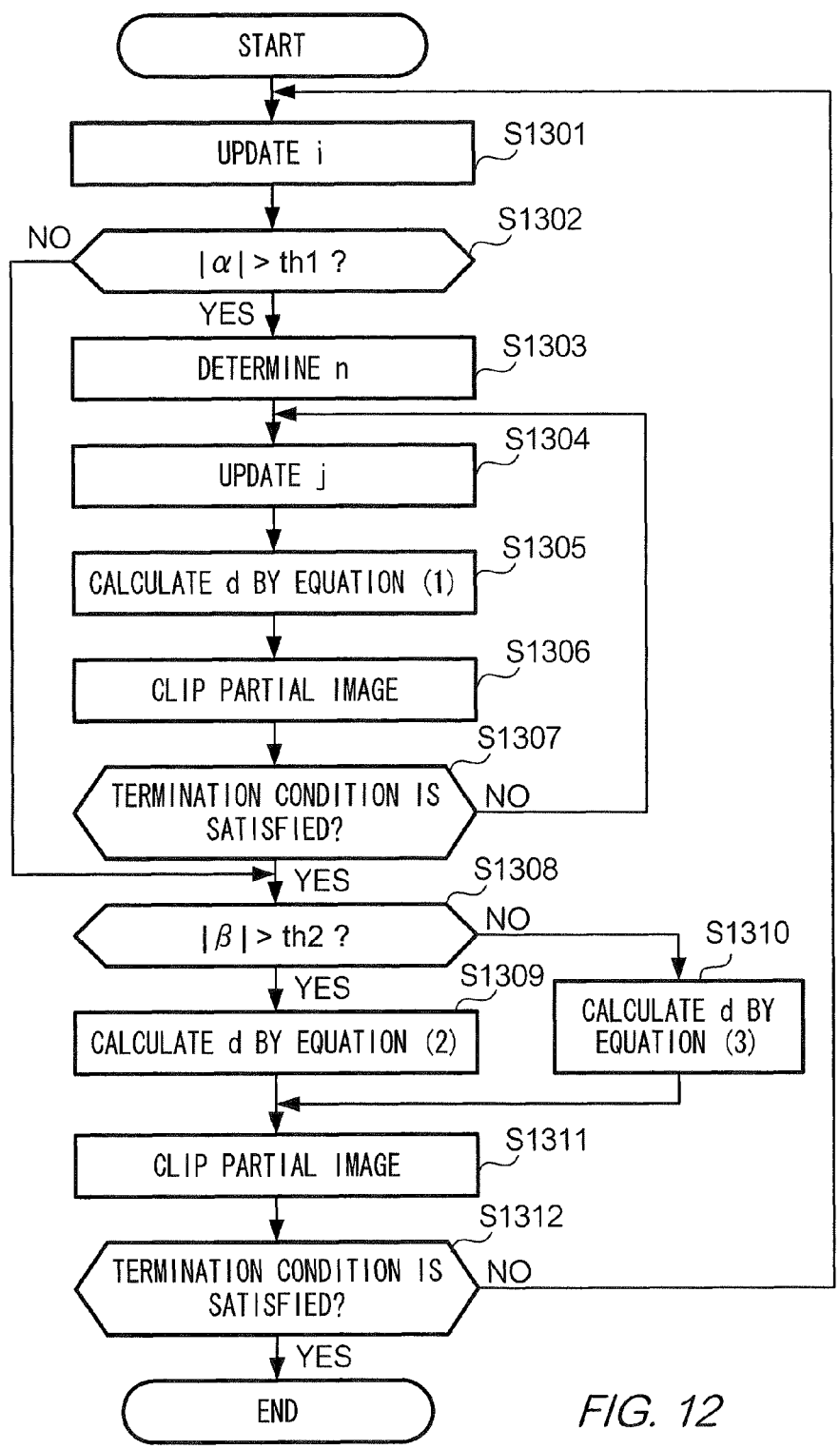
FIG. 12 shows an example of a flowchart illustrating a process for clipping a partial image.

FIG. 12 shows an example of a flowchart illustrating a process for clipping a partial image. In the following description, sequential numbers are allocated to the points on the pathway. Among points on the pathway after reducing, i-th point is denoted as point PP(i), and a panoramic image corresponding to point PP(i) is denoted as I(i). In an example shown in FIG. 9 without reducing, PP(1)=P12, PP(2)=P13, PP(3)=P3, PP(4)=P9, and PP(5)=P10. Further, a direction of the line of sight for clipping i-th partial image is denoted as direction d(i). i-th partial image is denoted as IP(i). A vector from point PP(i−1) to point PP(i) is denoted as vector r(i).

In step S1301, control unit 510 updates loop counter i. In the case of a first loop, loop counter i is initialized. In step S1302, control unit 510 determines whether angle α between d(i−1) and r(i+1) is greater than threshold th1. Threshold th1 corresponds to an intersection or a corner, and is 45°, for example. A case where angle α is greater than threshold th1 corresponds to a case where the point is near an intersection or a corner and the line of sight rotates to a large extent. If it is determined that angle α is greater than threshold th1 (in step S1302: YES), control unit 510 transfers the operation to step S1303. If it is determined that angle α is less than or equal to threshold th1 (in step S1302: NO), control unit 510 transfers the operation to step S1308.

In step S1303, control unit 510 determines number n of partitions for dividing an angle of rotation of the line of sight. Number n is determined in response to angle α. For example, the larger angle α is, the larger number n becomes. In step S1304, control unit 510 updates loop counter j. In the case of a first loop, loop counter j is initialized. In step S1305, control unit 510 calculates direction d in accordance with the following equation (1).

$$d(i)=d(i-1)+[\{r(i+1)-d(i-1)\} \times j]/n \qquad (1)$$

It is to be noted that, since plural partial images may be clipped from a single panoramic image, the number of partial images as a whole may be greater than the number of panoramic images. If plural partial images are clipped from a single panoramic image, PP(i) and d(i) do not correspond to an identical panoramic image subsequent to the single panoramic image. For example, if three partial images are clipped from a single panoramic image, a direction corresponding to point PP(i) is direction dd(i+2). However, for simplification, point PP(i) and direction d(i) are assumed to correspond to an identical panoramic image. In step S1305, control unit 510 clips (in step S1306) partial image IP(i+1) from panoramic image I(i). Control unit 510 stores data of the clipped partial image in storing unit 520. The data includes the identification of the panoramic image from which the partial image is clipped.

In step S1307, control unit 510 determines whether a termination condition is satisfied. In this example, the termination condition is j=n. If it is determined that the termination condition is satisfied (in step S1307: YES), control unit 510 transfers the operation to step S1308. If it is determined that the termination condition is not satisfied (in step S1307: NO), control unit 510 transfers the operation to step S1304.

In step S1308, control unit 510 determines whether angle β between vectors r(i) and r(i+1) is greater than threshold th2. Threshold th2 corresponds to an intersection or a corner, and is 45°, for example. Although threshold th2 is equal to threshold th1 in this example, thresholds th1 and th2 may be different. A case where angle β is greater than threshold th2 corresponds to a case where the point is one point before an intersection or a corner and the line of sight rotates to a large extent at the next point. In this example, to prevent too much rotation at the intersection or the corner, the line of sight preliminarily rotates at one point before the intersection or the corner. If it is determined that angle β is greater than threshold th2 (in step S1308: YES), control unit 510 transfers the operation to step S1309. If it is determined that angle β is less than or equal to threshold th2 (in step S1308: NO), control unit 510 transfers the operation to step S1310.

In step S1309, control unit 510 calculates direction d according to the following equation (2).

$$d(i)=r(i)+\{rr(i)-r(i)\} \times k \qquad (2)$$

Here, vector rr(i) is a vector from point PP(i) to point PP(i+2). Coefficient k is a predetermined constant that satisfies 0<k<=1.

In step S1310, control unit 510 calculates direction d according to the following equation (3).

$$d(i)=r(i) \qquad (3)$$

It is to be noted that the following equation (4) may be used instead of equation (3).

$$d(i)=d(i-1) \qquad (4)$$

In step S1311, control unit 510 clips partial image IP(i+j) from panoramic image I(i) using the calculated direction d(i). Control unit 510 stores in storing unit 520 data showing the clipped partial image. The data includes identification of a panoramic image from which the partial image is clipped.

In step S1312, control unit 510 determines whether a termination condition for the loop is satisfied. In this example, the termination condition is i=imax. Parameter imax denotes the number of panoramic images selected in step S120. If it is determined that the termination condition is satisfied (in step S1312: YES), control unit 510 terminates the process shown in FIG. 12. If it is determined that the termination condition is not satisfied (in step S1312: NO), control unit 510 transfers the operation to step S1301.

Among processes shown in FIG. 12, steps S1302 to S1307 correspond to a process for clipping plural partial images of different directions of the line of sight from a single panoramic image, and steps S1308 to S1312 correspond to changing a direction of the line of sight to a direction of the line of sight after an intersection or a corner. Although one point subsequent to the current point is referred to to determine whether to change the direction of the line of sight, the point to be referred to to determine whether to change the direction is not restricted to one point after the current point. A point two or more points subsequent to the current point may be referred to to determine whether to change the direction. Alternatively, plural points after the current point may be referred to to determine whether to change the direction.

Referring to FIG. 11 again, if the clipping of partial images is completed for all of the selected panoramic images, control unit 510 transmits (in step S207) data showing the clipped partial images, to information-processing device 300, which is a source of the request.

In step S140, control unit 310 of information-processing device 300 obtains (in step S140) the data showing the partial images from server device 500. Control unit 310 controls display unit 250 to display the partial images sequentially in an order along with the pathway, using the received data. Display unit 250 sequentially displays (in step S150) the partial images. Details of the process for sequentially displaying the partial images are as follows.

Figure 13:
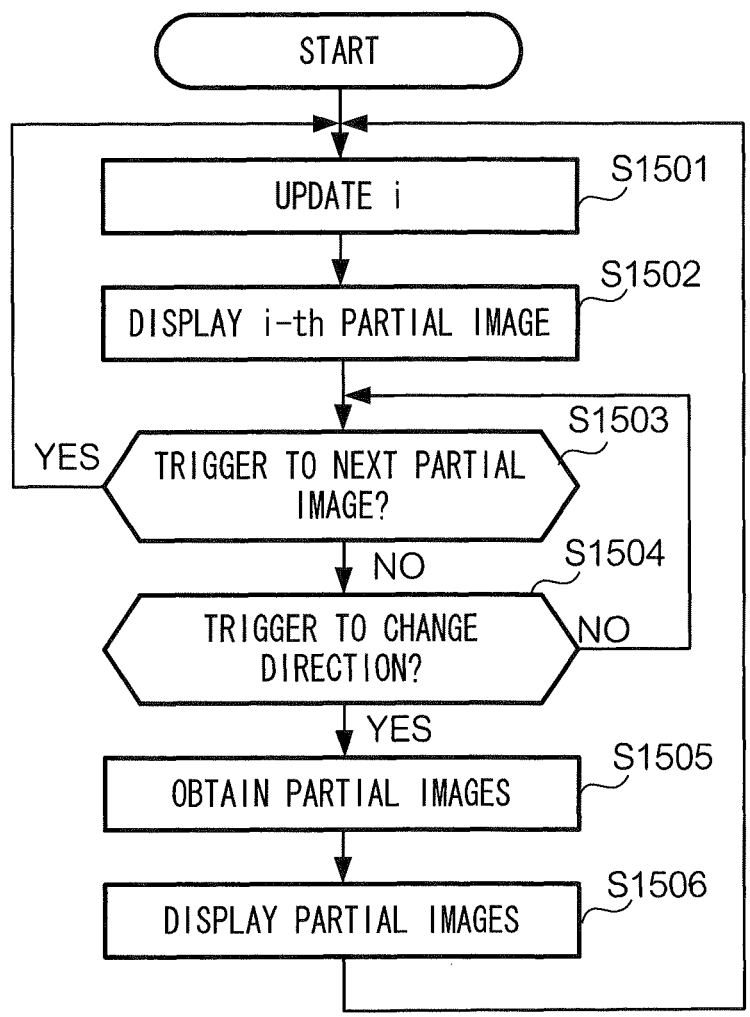
FIG. 13 shows an example of a flowchart illustrating a process for displaying partial images.

FIG. 13 shows an example of a flowchart illustrating a process for displaying partial images. In step S1501, control unit 310 updates loop counter i. In the case of a first loop, loop counter i is initialized. If the termination condition for the loop is satisfied, the process shown in FIG. 13 is terminated.

In step S1502, control unit 310 controls display unit 250 to display i-th partial image PI(i). In step S1503, control unit 310 determines whether there is a trigger to switch the next partial image. The trigger is, for example, an instruction by a user. The instruction is input via input unit 240 (for example, by pushing of a button) or via touch screen unit 260 (for example, by touching of a predetermined location). Alternatively, the trigger may be elapsing of a predetermined time from the image displayed on display unit 250 being switched to partial image IP(i). If it is determined that there is a trigger (in step S1503: YES), control unit 310 transfers the process to step S1501. If it is determined there is not a trigger (in step S1503: NO), control unit 310 transfers the process to step S1501.

In step S1504, control unit 310 determines whether there is a trigger to change the direction of the line of sight. The trigger is, for example, an instruction input by a user. The instruction is input via motion sensor 270. For example, if terminal device 200 is rotated from north to east by 30°, an instruction to rotate clockwise the line of sight by 30° is input to control unit 310. If it is determined that there is a trigger (in step S1504: YES), control unit 310 transfers the process to step S1505. If it is determined that there is not a trigger (in step S1504:NO), control unit 310 transfers the process to step S1503.

In step S1505, control unit 310 obtains a partial image corresponding to the changed direction of the line of sight. More specifically, control unit 310 transmits a request for a partial image corresponding to the changed line of sight, to server device 500. The request includes an identification of a panoramic image from which a partial image currently displayed is clipped, and a parameter for identifying the direction of the line of sight. Control unit 510 of server device 500 clips a partial image from the panoramic image in response to the request. Control unit 510 transmits data showing the clipped partial image to information-processing device 300, which is the source of the request. Control unit 310 controls (in step S1506) display unit 250 to display the partial image according to the data received from the server device 500. In other words, here, transfer from the current partial image to the next partial image is paused, and further, during the pause, another partial image corresponding to the point of the current partial image and different direction at the point, is displayed. If it is determined that there is a trigger to switch the next partial image (in step S1503), transfer to the next partial image resumes.

Figure 14:
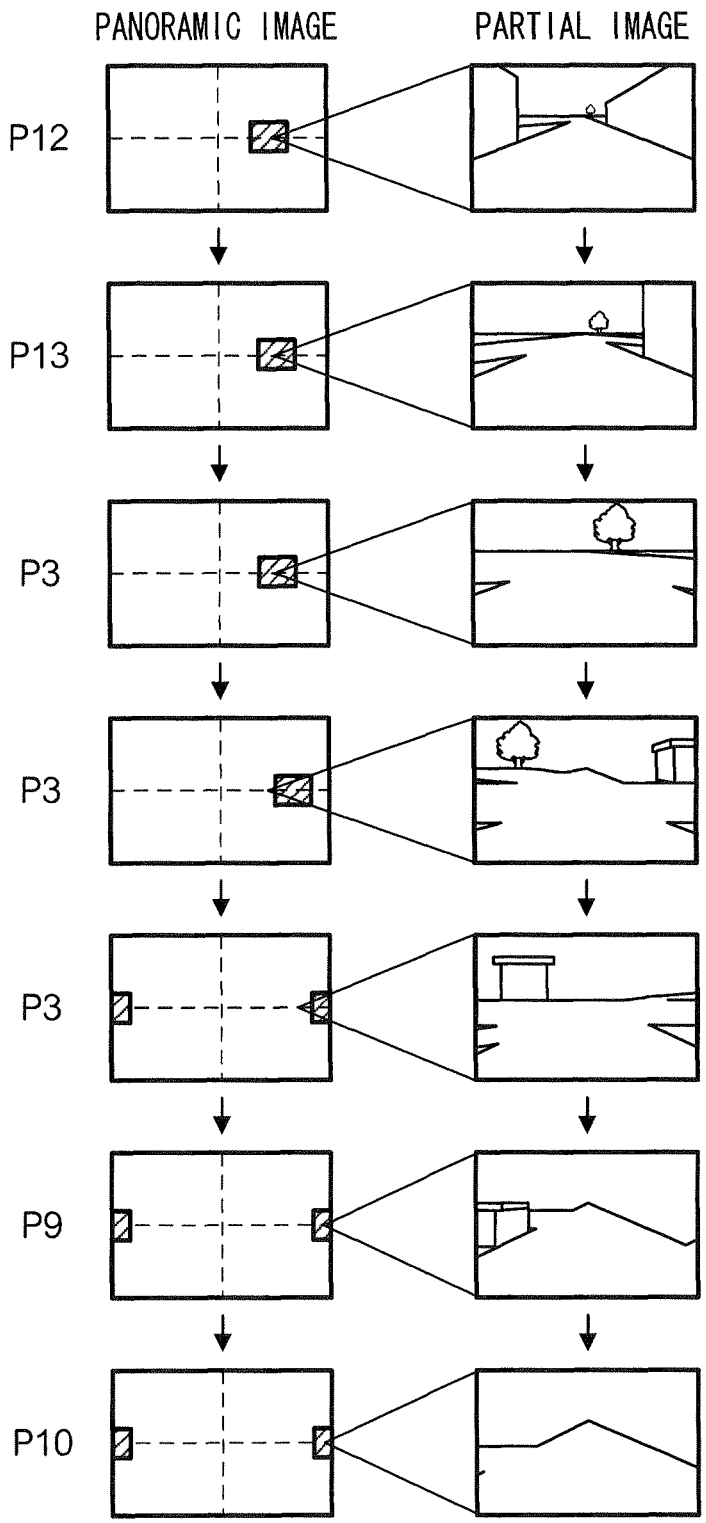
FIG. 14 shows an example of partial images sequentially displayed along with a pathway in information-processing system 1.

FIG. 14 shows an example of partial images sequentially displayed along with a pathway in information-processing system 1. In this example, partial images, along with the pathway shown in FIG. 9, are shown. For the purpose of description, corresponding panoramic images are shown at the left side of the partial images, along with identification thereof. In the panoramic images, parts that are clipped as the partial images are shown by hatching. It is to be noted that, although mappings of the partial images on the panoramic images may not be rectangular, the parts are shown as rectangular in FIG. 14, for simplification. Since the direction of the pathway is northeast at points P12 and P13, parts corresponding to northeast are clipped from the panoramic images. Since point P3 is located at an intersection, three partial images are clipped from a single panoramic image. These three partial images correspond to rotation of the line of sight from northeast to south. Since the direction of the pathway is northeast at points P9 and P10, parts corresponding to northeast are clipped from the panoramic images. According to the information-processing system 1, partial images in response to the direction of the line of sight at the points on the pathway are sequentially displayed.

4. Modification

The present disclosure is not restricted to the exemplary embodiment described above. Some modifications are described below. At least two of the following modifications may be combined.

Allocations of functions to information-processing device 300m terminal device 200, and sever device 500 are not restricted to an example shown in FIG. 11. For example, information-processing device 300 may have at least a part of the functions of server device 500. Further, server device 500 may have at least a part of the functions of information-processing device 300.

As another example of allocation of functions between information-processing device 300 and server device 500, information-processing device 300 may have a function to execute reducing (step S120) of panoramic images. In such a case, after receiving information showing pathway, information-processing device 300 thins points (or panoramic images) on the pathway according to a predetermined algorithm described above. Information-processing device 300 transmits a request including identifications of the reduced points to server device 500. Alternatively, information-processing device 300 may transmit information showing the pathway according to a method other than transmitting unique identifications corresponding to the panoramic images. For example, information-processing device 300 may transmit to server device 500 information showing latitude and longitude of curves and intersections. In such a case, server device 500 detects identifications of points included in the pathway, from the information transmitted from information-processing device 300.

At least a part of processes shown in FIGS. 7, 11, 12, and 13 may be omitted. For example, reducing the panoramic images (in step S120) may be omitted. Alternatively, an order of parts of processes may be changed.

In the exemplary embodiment described above, the partial images along the pathway are sequentially displayed one by one (in other words, displayed image is sequentially switched). However a method for displaying partial images along the pathway is not restricted to the example. For example, plural partial images may be simultaneously displayed on a single screen.

The pathway may not be identified by a user. For example, a user may identify only a start point and a destination. A pathway from the start point to the destination may be identified (or determined) by server device 500 or information-processing device 300. In another example, server device 500 may provide a predetermined pathway to a user. Alternatively, pathway data generated by a user may be provided to information-processing device 300 of another user. In such a case, the pathway data may be provided from one information-processing device 300 via server device 500 to another information-processing device 300.

In another example, information-processing device 300 may modify a pathway obtained from server device 500, in response to an instruction input by a user touching touch screen unit 260. In such a case, information-processing device 300 transmits information showing the pathway modified with terminal device 200, to server device 500. Further, the foregoing pathway may be changed after the user has left the start point. In such a case, information-processing device 300 transmits information showing modification of the pathway according to an instruction input by a user, to server device 500. Server device 500 transmits partial images corresponding to the modified part of the pathway, to information-processing device 300.

A trigger to switch the next partial image (in step S1503) is not restricted to an instruction input by a user. For example, a current partial image may be automatically switched to the next partial image along with a pathway, as a so-called slide show. In such a case, speed of switching to the next partial image may be automatically determined by the system, or deter mined by a user. If a user determines the speed, information-processing device 300 may provide speed options, for example, a speed taken: of a tortoise; on foot, of a bicycle, of a car, of a train, of an airplane, or of a space ship. Information-processing device 300 provides replays of the pathway at a speed according to the selected option.

If no panoramic image corresponding to a point on a pathway is stored on server device 500, in other words, if at least a part of the partial images along with the pathway cannot be obtained, information-processing device 300 may display on display unit 250 an animated scene of a moving point on the map, instead of displaying the partial images.

After server device 500 transmits to information-processing device 300 partial images along with a pathway, server device 500 may obtain panoramic images corresponding to the points on the pathway, and store the panoramic images in storing unit 520 as a cache. In such a case, if a pathway to a return trip of a previous pathway is identified, server device 500 may clip partial images from the cached panoramic images.

When partial images are sequentially displayed, the partial images may be displayed with low resolution at first, and then, if the displaying is paused at a partial image (or time of displaying of a partial image is greater than a threshold), the partial image may be displayed with high resolution.

If a user inputs an instruction to change a direction, a partial image may be clipped in response to the change of the direction, from a panoramic image corresponding to a point where the instruction is input. In such a case, information-processing device 300 obtains from server device 500 plural panoramic images corresponding to the pathway, instead of obtaining plural partial images. In other words, information-processing device 300 clips a partial image from a panoramic image, instead of server device 500. More specifically, if a user inputs an instruction to change a direction, information-processing device 300 clips a partial image in response to the change of the direction, from a panoramic image corresponding to a point where the instruction is input. Information-processing device 300 controls terminal device 200 to display the clipped partial image. It is to be noted that the instruction to change the direction is input, for example, according to a change of the attitude of terminal device 200 (for example, by tilting terminal device 200).

Though details of an image displayed on display device 100 are not described in the exemplary embodiment described above, a map and a point corresponding to a current partial image may be displayed on display device 100. Alternatively, an image not relating to the map program (for example, a television show) may be displayed on display device 100.

A map shown by the map data is not restricted to a map on dry land. For example, the map may be of the seabed or undersea channels. Further, the map may show geography of somewhere other than the earth, for example, the moon. Alternatively, the map may show geography of a virtual space. In such a case, images generated by 3-dimensional computer graphics may be used as the panoramic images.

The hardware configuration of information-processing system 1 is not restricted to an example described in the exemplary embodiment. For example, a single device, for example, a portable game device, a tablet device, or a smart phone may have all functions of the information-processing system 1.

Functions of information-processing device 300 may be implemented by hardware and/or software. In a case that the functions are implemented by software, plural programs may be used to implement the functions. These programs may not be restricted to execution in a single device, and may be executed in plural devices. Further, each of the programs may be provided by a storage medium such as an optical disc or a semiconductor memory, for example. Alternatively, each of the programs may be downloaded to an information-processing device via a network such as the Internet.

Equations and parameters described in the exemplary embodiment are merely examples. The present disclosure is not restricted to the example.

What is claimed is:

1. An information-processing system comprising:
at least one hardware processor coupled to a memory, the at least one hardware processor programmed to:
obtain a plurality of images, each of which is clipped from each of a plurality of panoramic images, the plurality of images being determined in response to a pathway on a map with each one of the plurality of panoramic images corresponding to a point on the map; and
sequentially output the plurality of images to a display screen for display thereon, where only one image from among the plurality of images is displayed on the display screen at any one time over the sequentially output plurality of images, where the sequentially output plurality of images are time-sequentially switched from one to another,
wherein each one of the plurality of panoramic images from which the plurality of images are obtained are panoramic images that have been already captured,
wherein the sequentially output plurality of images are sequentially switched independently of input provided from a user and during a time period of being sequentially switched independent of input provided from a user the plurality of images are output at a first image resolution,
wherein the at least one hardware processor is further configured to:
accept an input, while the plurality of images are being sequentially switched, to pause or interrupt the sequential switching of the plurality of images; and
responsive to the accepted input, show at least one of the plurality of images at a second image resolution that is higher than the first image resolution.

2. The information-processing system according to claim 1, where the at least one hardware processor is further programmed to determine the plurality of panoramic images in accordance with the pathway.

3. The information-processing system according to claim 2, wherein the at least one hardware processor is further programmed to:
select a selection of points included in the pathway,
wherein the plurality of images clipped from panoramic images are obtained based on the selection of points.

4. The information-processing system according to claim 1, wherein the plurality of images clipped from the plurality of panoramic images are clipped in response to a direction determined according to the pathway.

5. The information-processing system according to claim 4, wherein
an image is clipped from one panoramic image selected from among the plurality of panoramic images, in response to a direction corresponding to a positional relationship between the one panoramic image and another panoramic image corresponding to a point adjacent to a point of the one panoramic image.

6. The information-processing system according to claim 4, wherein
image is clipped from one panoramic image selected from among the plurality of panoramic images, in response to a direction corresponding to a positional relationship between the one panoramic image and another panoramic image corresponding to a position adjacent to a position of the one panoramic image.

7. The information-processing system according to claim 4, wherein at least two images are clipped from the one panoramic image, each of the at least two images corresponding to different directions, and
an image is clipped from another panoramic image corresponding to a point adjacent to a point corresponding to the one panoramic image, after the at least two images are clipped from the one panoramic image.

8. The information-processing system according to claim 7, wherein if a change in a direction of the pathway is greater than a threshold at the point corresponding to the one panoramic image, the at least two images are clipped from the one panoramic image.

9. The information-processing system according to claim 1, wherein the at least one hardware processor is further programmed to:
pause the process for sequentially displaying the plurality of images with one image being displayed, and
switch the displayed one image in response to a determined direction or a determined orientation of the display screen.

10. The information-processing system according to claim 1, wherein the at least one hardware processor is further programmed to determine the pathway in response to an instruction input by a user.

11. The information-processing system according to claim 1, wherein the at least one hardware processor is further programmed to receive the pathway.

12. The information-processing system of claim 1, wherein at least some of the plurality of images are clipped from different ones of the plurality of panoramic images.

13. The information-processing system of claim 1, wherein each one of the plurality of panoramic images is stored in the memory prior to having a corresponding one of the plurality of images clipped therefrom.

14. The information-processing device of claim 1, wherein the at least one hardware processor is further configured to:
maintain an electronic timer that is used to determine when the period of time has expired; and
in response to the period of time expiring on the timer, automatically switch from one of the plurality of images to another one of the plurality of images and reset the timer.

15. The information-processing device of claim 1, wherein the at least one hardware processor is further configured to:
control the output of each one of the plurality of images displayed on the display screen such that each one of the plurality of images is displayed for the same amount of time on the display screen.

16. The information-processing device of claim 1, wherein the at least one hardware processor is further configured to:
receive user provided input that identifies the pathway from at least a start point of the pathway to an end point of the pathway,
wherein the plurality of images are obtained in correspondence with the pathway,
wherein the plurality of images are sequentially output, independent of input provided from the user, after the user provided input that identifies the pathway from at least the start point to the end point is received.

17. An information-processing device, comprising:
a display device that includes a display screen; and
a processing system that includes at least one hardware processor coupled to the memory and the display device, the processing system configured to:
obtain a plurality of images where each of the plurality of images is a partial portion clipped from one of a plurality of panoramic images, the plurality of images being determined in response to a pathway on a map, each one of the plurality of panoramic images corresponding to a point on the map;
sequentially output, to the display device, the plurality of images on the display screen for display thereon, where only one image from among the plurality of images is displayed on the display screen at any one time over the sequentially output plurality of images,
where the sequentially output plurality of images are automatically sequentially switched from one to another based on an expiration of a period of time and independent of input provided from a user;
determine if at least one of the plurality of images has been displayed for greater than a threshold period of time; and
responsive to the determination, cause the at least one of the plurality of images to be displayed at a resolution that is higher than other ones of the plurality of images,
wherein each one of the plurality of panoramic images from which the plurality of images are obtained are panoramic images that were capture prior the corresponding partial portion being clipped therefrom.

18. A non-transitory computer readable storage medium storing an image program for use with a computer that includes at least one hardware processor coupled a memory, the image program comprising instructions configured to cause the computer to:
obtain a plurality of images, each of which is clipped from one of a plurality of panoramic images, the plurality of images being determined in response to a pathway on a map, with each one of the of the plurality of panoramic images corresponding to a point on the map;
control a display, which includes a display screen, to sequentially display the plurality of images on the display screen, where only one image from among the plurality of images is displayed on the display screen at any one time over the sequentially output plurality of images, where the sequentially output plurality of images are time-sequentially switched from one to another independent of input provided from a user;
determine that at least one of the plurality of images has been displayed for greater than a threshold period of time; and
responsive to determination that an image of the plurality of images has been displayed for greater than a threshold period of time, cause the corresponding image to be displayed at a resolution that is higher than other ones of the plurality of images,
wherein each one of the plurality of images is obtained from a corresponding one of the plurality of panoramic images that has already been captured by a camera and subsequently stored in the memory of the computer.

19. A method of configuring at least one hardware processor coupled to a memory, the method comprising:
clipping a partial portion from each one of a plurality of panoramic images to obtain a plurality of images, the partial portion that is to be clipped from a corresponding panoramic image being determined in response to a pathway on a map, where each one of the plurality of panoramic images correspond to a point on the map;
outputting the obtained plurality of images to a display screen for display thereon; and
time-sequentially switching between the plurality of images that are being output, where only one image from among the plurality of images is displayed on the display screen at any one time over the sequentially output plurality of images;
accepting an input, while the plurality of images are being time-sequentially switched, to pause or interrupt the time-sequential switching of the plurality of images; and
responsive to the accepted input, showing at least one of the plurality of images at a second image resolution that is higher than a first image resolution, wherein each one of the plurality of panoramic images from which each partial portion is clipped has already been captured by an imager, wherein the sequentially output plurality of images are sequentially switched independently of input provided from a user and during a time period of the plurality of images being sequentially switched independent of user input are shown at the first image resolution.

* * * * *